Figure 1:
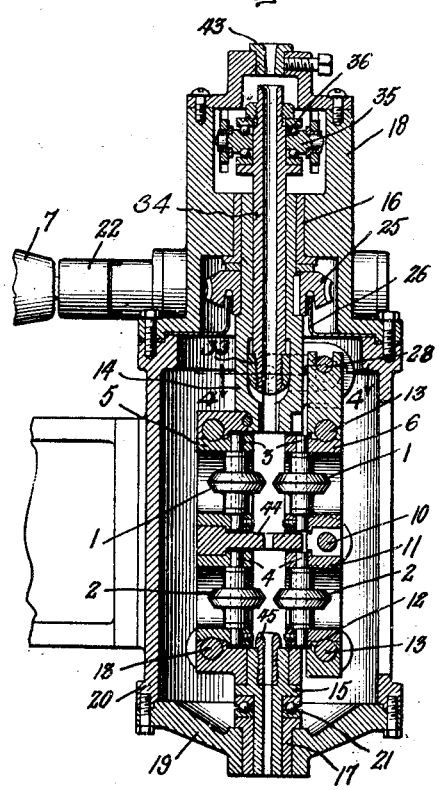

Oct. 29, 1929.  C. STEENSTRUP  1,733,836

WIRE FEEDING MECHANISM FOR WELDING MACHINES

Filed Nov. 23, 1927

Inventor:
Christian Steenstrup,
by
His Attorney

Patented Oct. 29, 1929

1,733,836

UNITED STATES PATENT OFFICE

CHRISTIAN STEENSTRUP, OF SCHENECTADY, NEW YORK, ASSIGNOR TO GENERAL ELECTRIC COMPANY, A CORPORATION OF NEW YORK

WIRE-FEEDING MECHANISM FOR WELDING MACHINES.

Application filed November 23, 1927. Serial No. 235,373.

My invention relates to welding and more particularly to improvements in the mechanism of automatic and semi-automatic welding machines used to feed a welding rod or wire towards the work as it is consumed during the welding operation. More particularly my invention relates to an improved mechanism for automatic and semi-automatic arc welding machines.

Hitherto it has been the usual practice in automatic machines for metallic arc welding to feed the electrode in the form of a wire of indefinite length to the work during the welding operation by friction rolls whose axes are at right angles to the electrode and whose surfaces are in frictional engagement with the electrode. In most of these machines of the prior art the feed motor has been connected to the feed rolls through speed reducing gearing since for successful operation it was found that the motor must operate at a comparatively high rate of speed while the feed rolls must turn at a low rate of speed. Change speed gears have likewise been used since the speed at which the electrode is fed must be greater for small electrodes than for larger electrodes and similar changes in speed are necessitated by the use of different current densities and correspondingly different rates of metal deposition.

An object of my invention is to provide an improved feeding device in which the axes of the feed rolls are parallel or nearly parallel to the welding wire and by which the wire is fed toward the work by a screw-like engagement therewith.

A further object of my invention is to provide an improved feeding device which shall be simple and effective and which shall produce a speed reduction inherently.

A further object of my invention is to provide in an automatic arc welding machine a feeding device comprising means for feeding the electrode in one direction and a different means for feeding the electrode in the opposite direction, both of which are controlled in a manner to feed the electrode relative to the work to strike and maintain the welding arc.

Further objects of my invention are to provide a wire feeding mechanism which may be built of standard size and form and be readily adjustable to accommodate any desired size of welding wire and adjusted for any desired rate of feed, and which may be used in gas welding machines or arc welding machines adapted to operate on any desired type of welding circuit whether constant voltage, constant current, direct current or alternating current.

My invention will be better understood from the following description taken in connection with the accompanying drawing and its scope will be pointed out in the appended claims.

Figure 2:
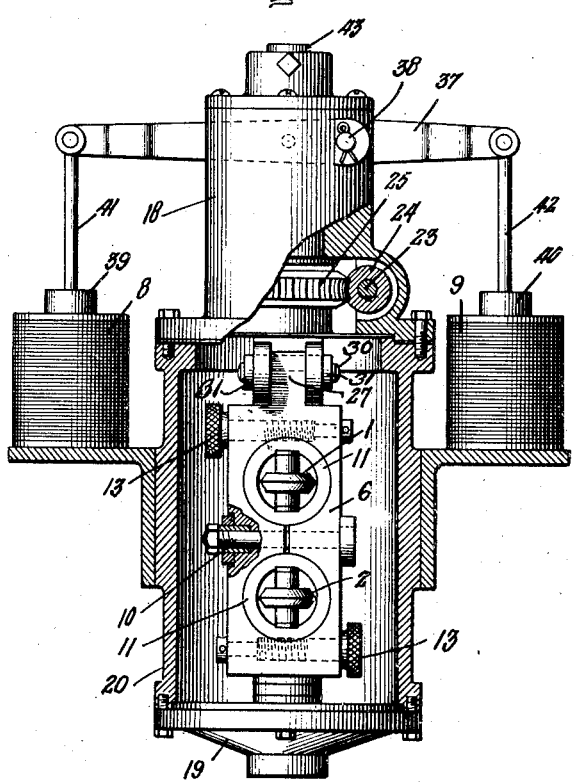
Figure 3:
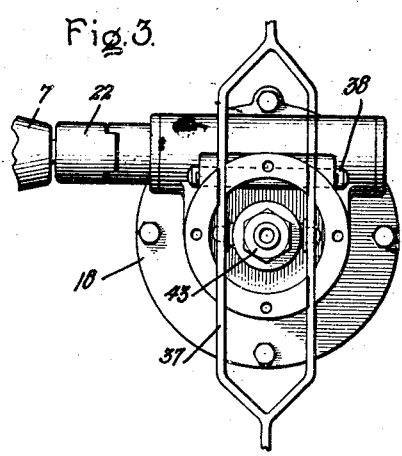
Figure 4:
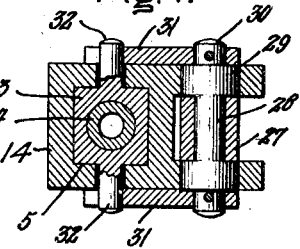
Figure 5:
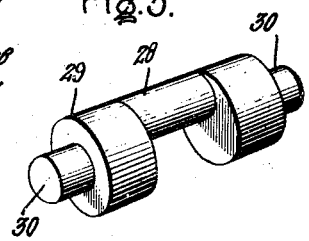

In the drawing Figs. 1 and 2 show side views partly in section of a welding head embodying my invention and Fig. 3 shows a top view of the same device. Fig. 4 is a sectional view of part of the mechanism taken along lines 4—4 of Fig. 1 and Fig. 5 shows the structure of a crank used in the device.

In the device illustrated in Figs. 1 and 2, one set of feed rolls 1 is provided for feeding the electrode in one direction through the device and another set of feed rolls 2 is provided for feeding the electrode in the reverse direction. These feed rolls are supported for rotation on axles 3 and 4 which are substantially parallel to the line of wire feed but displaced relative thereto a certain amount so that the axles of each pair of feed rolls are crossed relative to each other which causes those portions of the surfaces of the feed rolls in engagement with the wire to be fed to act like parts of an inside screw which by its engagement with the wire feeds it through the same when the feed rolls are rotated bodily about the wire. That is, the rolls of each pair of feed rolls 1 and 2 are crossed relative to each other and their axes are displaced from a parallel relationship with the wire by rotation in a given direction about axes perpendicular to the electrode. The feed rolls are mounted in frames 5 and 6 which are rotated about the line of wire feed by a constant speed motor 7, part only of which is shown in the drawing. The feeding mechanism thus comprises a member rotatable about the axis of wire feed and means carried by this member for feeding the wire in either direction. The rate of wire feed will depend on the angularity of the feed rolls relative to each other and the rate at which they are rotated about the wire being fed and for any given speed of rotation of the feeding device about the wire the speed of wire feed may be adjusted by adjusting the angularity of the feed rolls. Consequently, it is not necessary to provide change speed gears or reduction gears as in other feeding devices, since a device according to my invention when properly adjusted inherently accomplishes these desired results.

Means responsive to a characteristic of the arc that varies with the arc length comprising coils 8 and 9 are provided for moving one set of feed rolls or the other set of feed rolls into engagement with the wire to feed it in one direction or the other in a manner to strike and maintain the arc during the welding operation. Coils 8 and 9 may be energized by the operation of a contact making voltmeter responsive to arc voltage as disclosed in Letters Patent of the United States to Wilbur L. Merrill, No. 1,541,582, granted June 9, 1925, and assigned to the same assignee as the present case. According to this arrangement one coil will be energized when the arc length is too great and the other coil will be energized when the arc length is too short. Thus depending on arc conditions one or the other of these coils will be excited.

In the arrangement shown frame 6 is pivoted at 10 to frame 5 and the feed rolls 1 and 2 are adjusted relative to each other and the line of wire feed by rotating the bushings 11 in which they are mounted relative to the frames 5 and 6 in which these bushings are supported. In the arrangement shown in the drawing the bushings are illustrated as provided with gear teeth 12 controlled by worm screws 13.

Frame 5 is keyed to hollow shafts 14 and 15 which are supported in bushings 16 and 17 mounted in covers 18 and 19 which are bolted to cylindrical member 20 within which the feeding mechanism is mounted. An opening is provided in this member 20, which may be closed by a suitable cover, through which the operator may gain access to the feed rolls and adjust them relative to each other to secure the desired direction of electrode feed as well as the desired rate of electrode feed which will depend upon the amount and direction of tilt given to feed rolls 1 and 2 for any given speed of the feed motor 7. A thrust bearing 21 is provided between shaft 15 and bushing 17 to take up the weight of the feeding mechanism and enable it to be more easily rotated about the electrode as will appear from the description below.

Frames 5 and 6 are rotated by feed motor 7 through coupling 22, shaft 23, worm 24 and wormwheel 25 which is keyed to shaft 14. A shield 26 inserted between cover 18 and casing 20 extends upwardly into a recess in the gear 25 so that foreign substance such as oil and water cannot enter into the chamber within casing 20 where the feeding mechanism is located.

Frame 6 is provided with a lug 27 which fits over the central portion 28 of a crank 29 shown in detail in Fig. 5. The ends 30 of this crank are pin-connected to links 31 which are joined at their other ends to pins 32 forming part of a crosshead 33 located within hollow shaft 14. This crosshead is connected by a hollow rod 34 also located within hollow shaft 14 to a crank 35 through the agency of a bearing 36 which leaves it free to rotate about its own axis. The crosshead is connected to a frame 37 pivoted at 38 to cover 18 and may be tilted by coils 8—9 operating through cores 39 and 40 connected by links 41 and 42 to it. Thus depending upon which way frame 37 is tilted frame 6 will be tilted relative to frame 5 so that either feed rolls 1 or feed rolls 2 will engage the electrode wire being fed through the feeding device. The electrode is guided through the device by guides 43, 44 and 45.

In the mechanism just described after the wire has been fed by hand through guide 43, hollow rod 34, feed rolls 1, guide 44, feed rolls 2 and guide 45 in hollow shaft 15 so as to be under the control of the feed rolls the operation of the device is as follows:

For the purpose of this description I will assume that when the arc voltage is above a predetermined value coil 8 is excited and that when the arc voltage is below a certain value coil 9 is excited. With this arrangement feed rolls 1 and 2 will be adjusted so that rolls 1 when engaging the wire will feed it toward the work while rolls 2 when engaging the wire will feed it away from the work.

If the electrode is not in engagement with the work at the start of the welding operation when the welding circuit is connected to a source of supply the applied voltage impressed across the electrode and the work will be above the predetermined value referred to above and coil 8 will operate through core 39, link 41, frame 37, crosshead 35, rod 33, links 31 and crank 29 to tilt frame 6 relative to frame 5 so that feed rolls 1 engage the wire. At the same time frames 5 and 6 are being rotated at a constant rate of speed by the constant speed motor 7 through the driving connection including gears 23, 25 and hollow shaft 14. Thus the feed rolls 1 will feed the electrode toward the work in much the same manner as an inside screw when rotated would feed an outside screw inserted within it; the feed rolls 1 acting as an inside screw and the electrode wire corresponding to the outside screw. When the electrode engages the work the voltage across the electrode and the work will drop to zero and coil 9 will be energized. This coil will cause feed rolls 2 to engage the wire by tilting the frame 37 and frame 6 in the opposite direction from the direction in which it was tilted by coil 8. The mechanism will now operate to withdraw the wire electrode from the work and strike the arc. When the voltage across the arc approaches a predetermined value, depending upon the adjustment of the voltmeter, coil 8 will again be excited and cause feed rolls 1 to engage the work. Thereafter depending upon conditions of arc voltage which will vary with the arc length either feed rolls 1 or 2 will be brought into engagement with the electrode wire to feed it to or from the work in a manner to maintain the arc length constant.

In my application, Serial No. 235,372 for wire feeding mechanism for welding machines, filed concurrently with this application, I have disclosed and claimed feeding mechanism involving certain ideas of means which are utilized in the present invention which is directed to a species of such broad invention.

While I have described a particular embodiment of my invention it will be obvious to those skilled in the art that various modifications may be made without departing from my invention. For example, other arrangements may be provided for advancing feed rolls 1 or feed rolls 2 into engagement with the electrode in response to some characteristic of the arc. I, therefore, desire in the appended claims to cover all such modifications as fall within the true spirit and scope of my invention.

What I claim as new and desire to secure by Letters Patent of the United States, is:

1. A wire feeding mechanism comprising a member rotatable about the axis of wire feed, means carried by said member for feeding the wire in one direction, means also carried by said member for feeding the wire in the opposite direction, and means for bringing said feeding means into and out of engagement with the wire to be fed.

2. A wire feeding mechanism comprising a member rotatable about the axis of wire feed, means carried by said member for feeding the wire in one direction, means also carried by said member for feeding the wire in the opposite direction, and means for bringing one of said feeding means into engagement with the wire to be fed and withdrawing the other of said feeding means out of engagement with the wire to be fed.

3. A wire feeding mechanism comprising feeding members, one of which is tilted in a direction opposite to that in which the other is tilted relative to the wire to be fed, means for rotating said feeding members about the line of wire feed, and means for bringing one of said members into engagement with the wire and withdrawing the other member from engagement with the wire in order to control the direction in which the wire is fed.

4. A wire feeding mechanism for automatic arc welding machines comprising feeding members, one of which is tilted in a direction opposite to that in which the other is tilted relative to the wire to be fed, means for rotating said feeding members about the line of wire feed, and means responsive to a characteristic of the arc that varies with the arc length for forcing one or the other of said feeding members into engagement with the wire to control the direction in which it is fed in order to strike the welding arc and thereafter maintain it at substantially constant length.

5. A wire feeding mechanism comprising a plurality of feed rolls arranged to rotate on axes substantially parallel to the line of wire feed but tilted relative thereto a slight amount, one feed roll being tilted in a direction opposite to the direction in which the other feed roll is tilted, means for supporting said rolls, means for revolving said supporting means about the line of wire feed, and means for forcing one or the other of said feed rolls into engagement with a wire being fed through the feeding mechanism to control the direction in which it is fed.

6. A wire feeding mechanism comprising a frame supported for both rotary movement about the wire being fed and for a tilting movement about an axis at right angles to the wire, rollers supported in said frame on opposite sides of said pivot point for rotation about their own axes which are displaced from a parallel relationship with the wire by rotation in opposite directions about axes perpendicular to the wire, means for rotating said frame about the wire, and means for tilting the frame about its pivot for forcing one or the other of said rolls into engagement with the wire while the parts are in motion.

7. A wire feeding mechanism comprising a frame supported for rotation about the wire as an axis, a second frame pivotally supported on said first frame, two pairs of cross rolls arranged in said frames on opposite sides of said pivot point, one pair of rolls being adjusted when in engagement with the wire for feeding the wire in one direction and the other pair for feeding the wire in the opposite direction, means for rotating said frames and rolls about the wire as an axis, and means for tilting the pivoted frame about its pivot point while the parts are in motion to cause one or the other of said pairs of cross rolls to engage the wire.

8. An electrode feeding mechanism for automatic arc welding machines comprising a frame supported for rotation about the electrode as an axis, a second frame pivotally supported to said first frame, pairs of cross rolls arranged in said frames on opposite sides of said pivot, one of said pairs being adjusted when in engagement with the electrode to feed it into one direction and the other pair being adjusted to feed it in the opposite direction, a substantially constant speed motor for rotating said frames and rolls about the electrode as an axis, and means responsive to a characteristic of the arc that varies with the arc length for tilting the pivoted frame about its pivot point while the parts are in motion to cause one or the other of said pairs of cross rolls to engage the electrode and feed it in a manner to maintain the arc length substantially constant.

9. An electrode feeding mechanism for automatic arc welding machines comprising a frame supported for both a rotary movement about the electrode and for a tilting movement about an axis at right angles to the electrode, electrode rollers supported in said frame on opposite sides of said pivot point for rotation about their own axes which are displaced from a parallel relationship with the wire by rotation in opposite directions about axes perpendicular to the electrode, a substantially constant speed motor for rotating said frame about the electrode, and means responsive to a characteristic of the arc that varies with the arc length for tilting the frame about its pivot support for forcing one or the other of said rollers into engagement with the electrode to feed the electrode in a manner to maintain the arc length substantially constant.

In witness whereof, I have hereunto set my hand this 22nd day of November, 1927.

CHRISTIAN STEENSTRUP.